(No Model.) 5 Sheets—Sheet 1.
J. P. TURNEY.
CAR COUPLING.
No. 388,231. Patented Aug. 21, 1888.
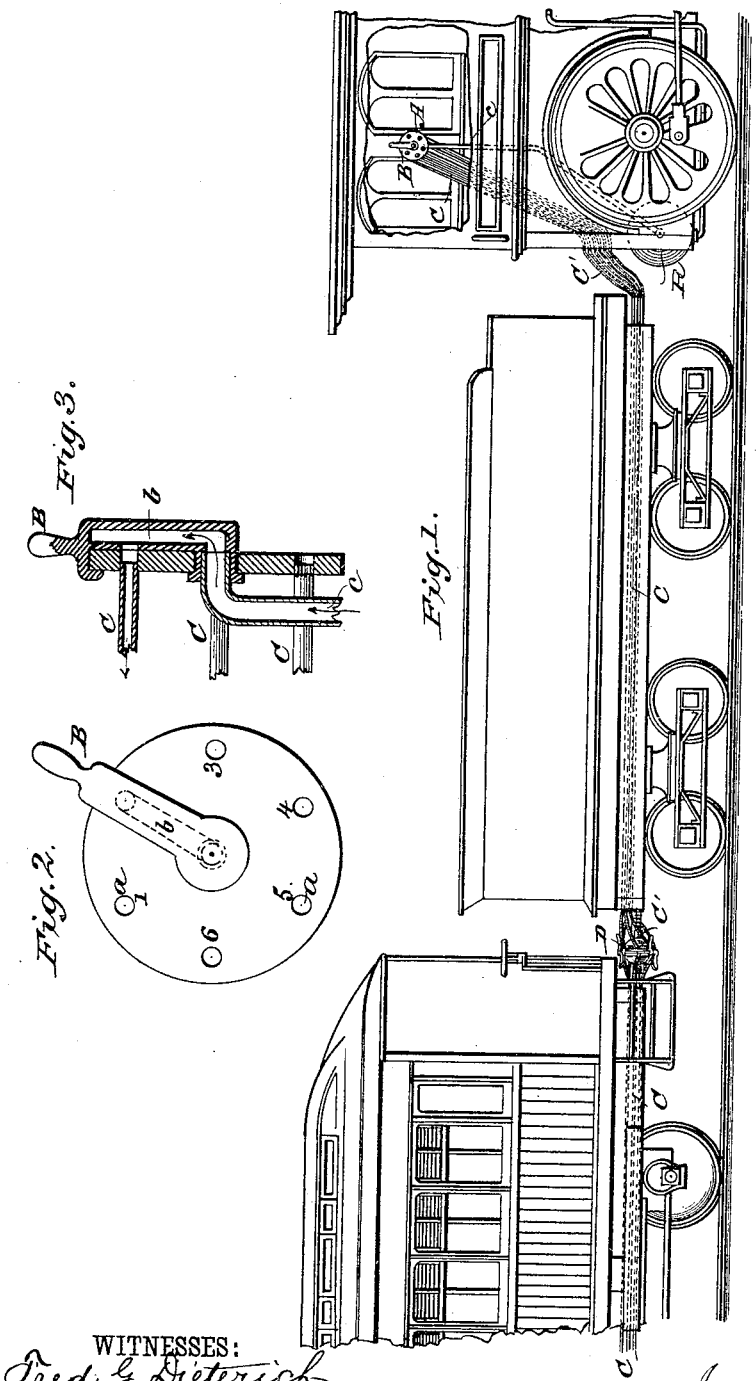
WITNESSES:
Fred G. Dieterich
Edw. N. Byrn
INVENTOR:
Jno. P. Turney
BY Munn & Co.
ATTORNEYS.

(No Model.) 5 Sheets—Sheet 2.
J. P. TURNEY.
CAR COUPLING.
No. 388,231. Patented Aug. 21, 1888.
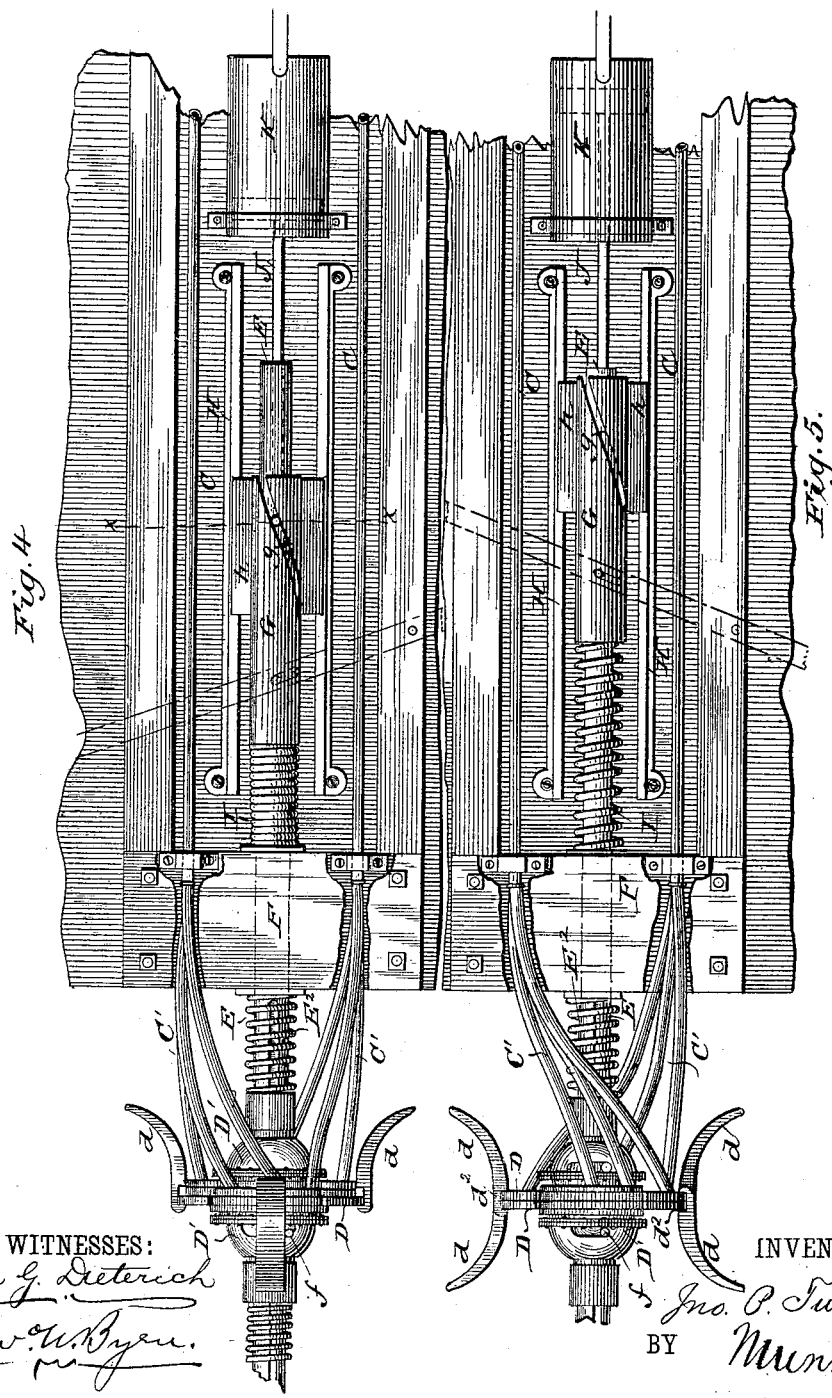
WITNESSES:
Fred G. Dieterich
Edw. W. Byrn.
INVENTOR:
Jno. P. Turney
BY Munn & Co.
ATTORNEYS.

(No Model.) 5 Sheets—Sheet 3.

J. P. TURNEY.
CAR COUPLING.

No. 388,231. Patented Aug. 21, 1888.

WITNESSES:
Fred G. Dieterich
Edw. W. Byrn

INVENTOR:
Jno. P. Turney.
BY Munn & Co
ATTORNEYS.

(No Model.) 5 Sheets—Sheet 4.
J. P. TURNEY.
CAR COUPLING.
No. 388,231. Patented Aug. 21, 1888.
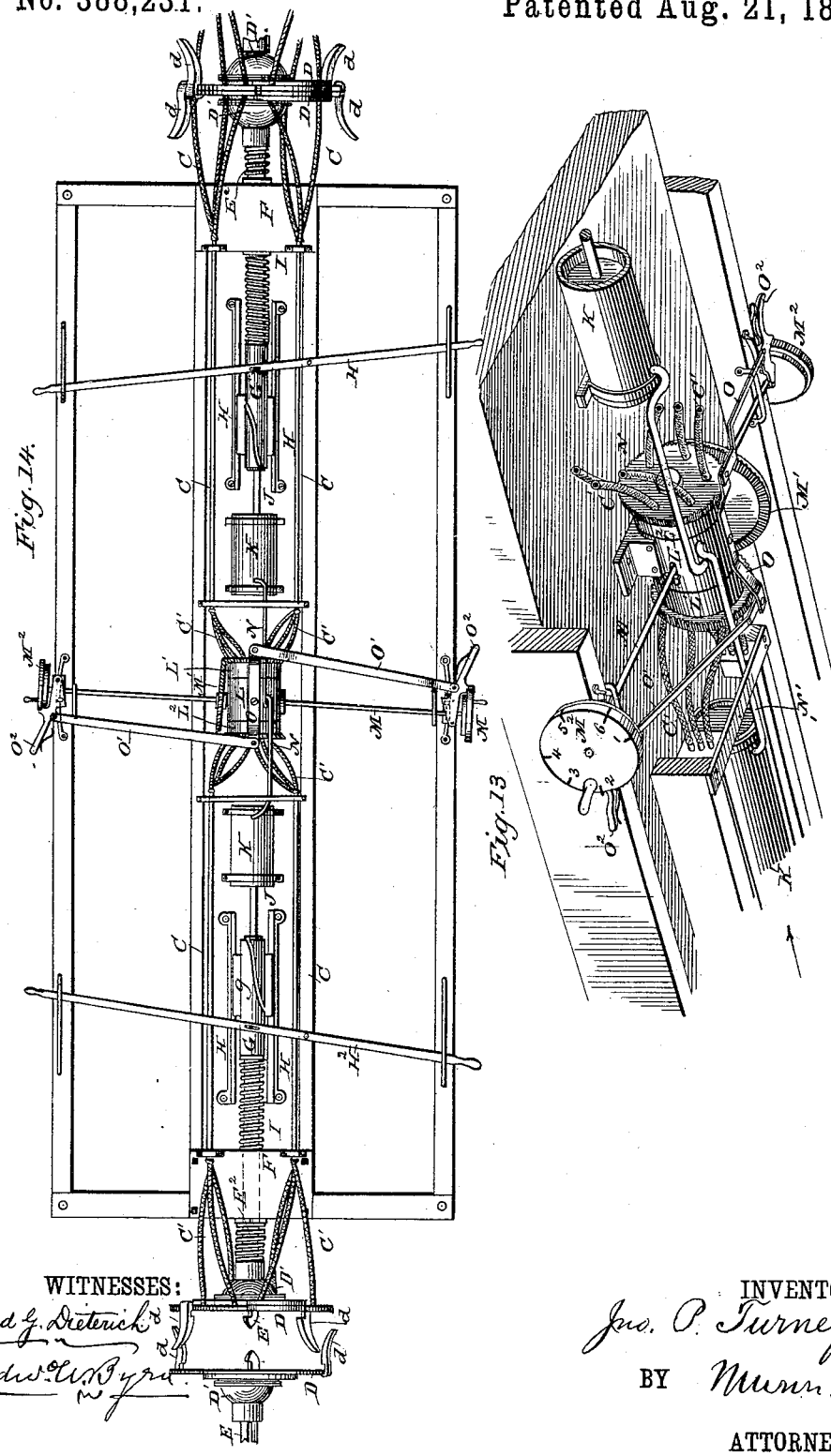
WITNESSES:
Fred G. Dieterick
Edw. W. Byrn
INVENTOR:
Jno. P. Turney
BY Munn & Co
ATTORNEYS.
N. PETERS, Photo-Lithographer, Washington, D. C.

(No Model.) 5 Sheets—Sheet 5.
J. P. TURNEY.
CAR COUPLING.
No. 388,231. Patented Aug. 21, 1888.
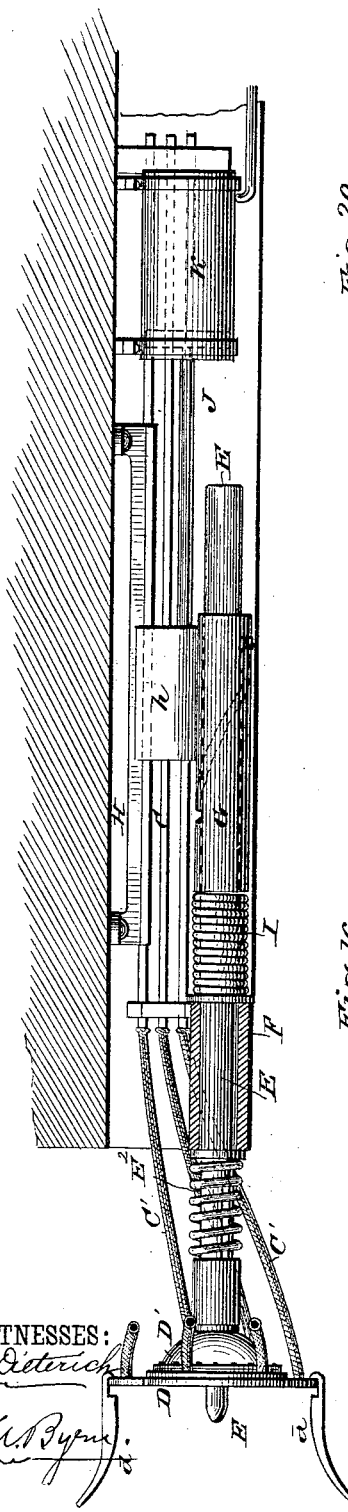
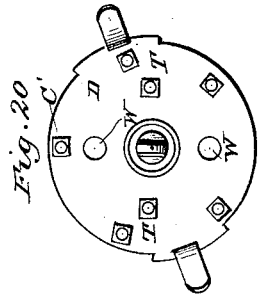
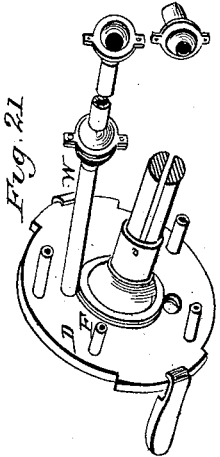
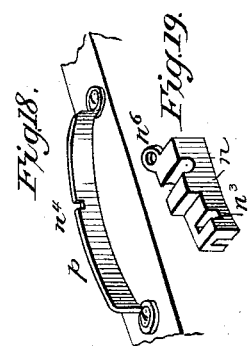
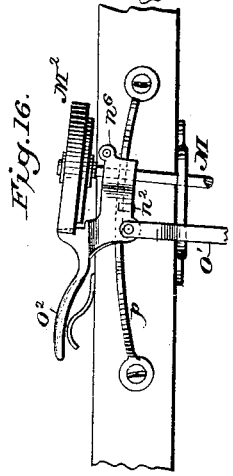
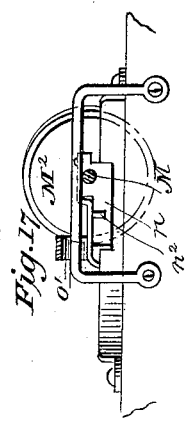
WITNESSES:
Fred G. Dieterich
Edw. W. Byrn
INVENTOR:
Jno. P. Turney
BY Munn & Co
ATTORNEYS.

UNITED STATES PATENT OFFICE.

JOHN P. TURNEY, OF ARLINGTON, OREGON.

CAR-COUPLING.

SPECIFICATION forming part of Letters Patent No. 388,231, dated August 21, 1888.

Application filed December 8, 1887. Serial No. 257,336. (No model.)

*To all whom it may concern:*

Be it known that I, JOHN P. TURNEY, a citizen of the United States, residing at Arlington, Gilliam county, and State of Oregon, have invented a new and useful Improvement in Car-Couplings, of which the following is a specification.

The object of my invention is to provide a car-coupling of such construction as will permit the coupling or uncoupling of the cars to be effected by the engineer, and to be always under his control.

To this end it consists in the peculiar construction and arrangement of pneumatic apparatus in which compressed air or steam is employed as the agency for accomplishing the work, as will be hereinafter fully described with reference to the drawings, in which—

Figure 6:
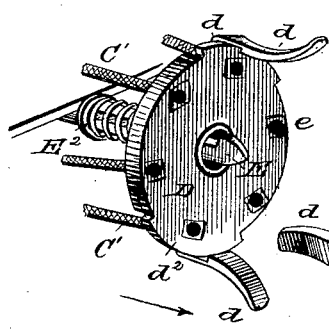
Figure 7:
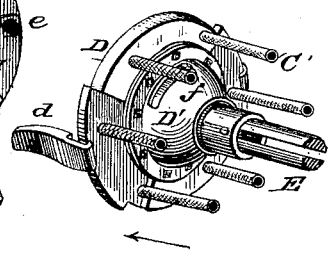
Figure 8:
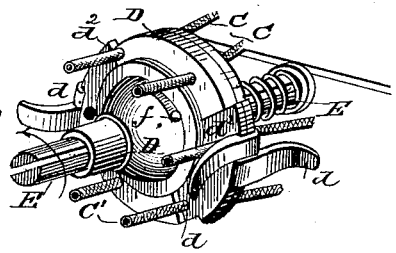
Figure 9:
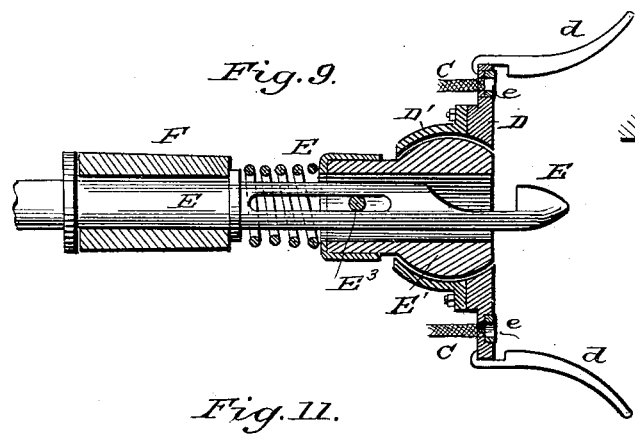
Figure 10:
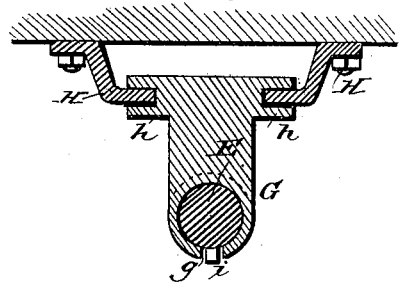
Figure 11:
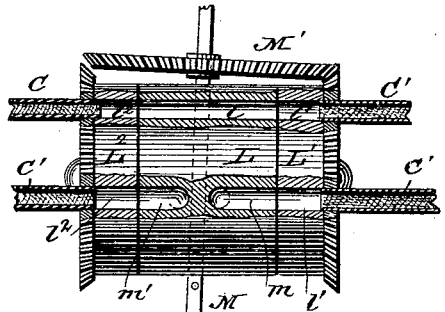
Figure 12:
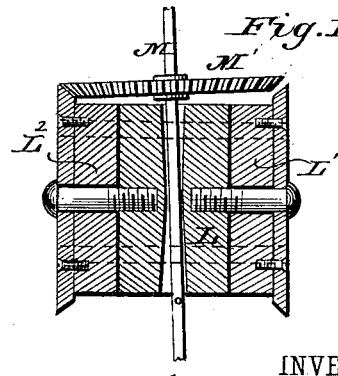

Figure 1 is a side elevation of the rear part of a locomotive, the tender, and the front part of a car, with my coupling device applied to the same. Fig. 2 is a side view, and Fig. 3 a section, of the device on the locomotive for directing the air-blast through any one of a series of tubes leading to the several cars of the train. Figs. 4 and 5 are underneath views of the ends of a car, showing two different positions of the parts in coupling. Figs. 6 and 7 are perspective views of the two draw-heads shown in the act of approaching each other to couple. Fig. 8 is a perspective view of them after they have come together and been coupled by a rotary action in the direction of the arrow. Fig. 9 is a longitudinal section of a draw-head. Fig. 10 is a cross section taken on the line $x\ x$ of Fig. 4. Figs. 11 and 12 are respectively a broken view and central horizontal section of the register, located on each car for changing the direction of the air-blast. Fig. 13 is an underneath perspective view of the middle of a car, showing the relation of this register to its co-operating parts. Fig. 14 is an inverted plan view of the car-body; Fig. 15, a vertical longitudinal section of one end of the car. Figs. 16, 17, 18, and 19 are detail views of a locking mechanism; and Figs. 20 and 21 are detail views of a modification of the coupling-plate.

Referring to Figs. 1, 2, and 3, A represents a disk or face-plate, which, through a series of holes, $a$, communicates with a series of tubes, C, and flexible couplings C', extending the full length of the train. These tubes in number correspond to the maximum number of cars in the train, and through any one of them an air-blast may be directed to operate the couplings of that car.

R is a reservoir for compressed air, which is located on the engine and may be the same that is employed for the air-brakes. From the reservoir a pipe, $c$, leads to the center of plate A, and over the end of this pipe there swings a radial arm, B, which has a channel-way, $b$, Fig. 3, in the same extending from the central pipe, $c$, to the range of the tubes C. By swinging this arm around the circle of the plate A a blast of air from the reservoir may be directed through any one of the tubes C and be made to operate upon the couplings of the car with which it may be in connection. These couplings are shown in Figs. 4 to 9. E is the draw-bar, which is swiveled in a bearing, F, (see Fig. 9,) which forms a part of the frame-work of the car. This draw-bar rotates freely, but has no longitudinal motion, and at its front end it is made hook-shaped, and just back of this point it has a longitudinal slot, through which passes a bolt, $E^3$, which fastens a coupling-head around the draw-bar. This coupling-head consists in part of a sleeve, E', which carries the bolt, and has a cap at its rear end that bears against a spiral spring, $E^2$, wound about the draw-bar. This permits the coupling-head to rotate with the draw-bar and still to have a yielding spring-seated bearing upon the same.

The forward end of sleeve E' is constructed with an enlarged convexity, upon which is mounted loosely the disk-shaped face-plate D, said face-plate being fastened upon the bulb of the sleeve by a socket-ring, D', to form a ball-and-socket joint that permits the face-plate to adapt itself easily to changes of its plane. This face-plate has a limited rotation in the bulb of the sleeve by means of a pin, $f$, Fig. 8, projecting through a slot in the socket-ring D'.

Through the face-plates D of all the cars are a number of openings arranged in circular series and which are in communication always with their respective pipes C', which pipes are numerous enough to allow one pipe for each car in the train and constitute the passages through which the blast of air is directed to any car in the train. These pipes are all brought into communication with each other whenever the face-plate D of one car is brought against the face-plate of the other car and the openings of one register with the openings in the other. To secure an air-tight connection of these openings when the face-plates come together, there are soft-rubber bushings $e$ set around the openings and having inclined faces to permit them to be brought tightly together when the rotary motion is given to the plates.

On each plate D there are two curved and hook-shaped arms, $d\,d$, arranged diametrically opposite to each other. These curved arms serve to guide the plates centrally together, and their hooked portions pass behind the flanges $d^2\,d^2$ of the opposite plate whenever axial rotation is given to the plates to couple the cars, as hereinafter described.

In coupling two cars their adjacent draw-bars occupy the relative position shown in Figs. 6 and 7. When the cars come together, the two draw-bars E E pass by each other and their hooked portions lap past each other. Then when rotary motion is given to one of the couplings, by means hereinafter described, the hook of one draw-bar turns into the hook of the opposite draw-bar, and at the same time the hooked arms $d\,d$ turn onto and couple the flanges $d^2\,d^2$, as shown in Fig. 8, thus tightly holding the face-plates together and forming a continuous air-tight joint.

I will now proceed to describe how the rotary motion is given to the draw-bar and coupling-head in coupling the cars, reference being had to Figs. 4 and 5. These coupling-heads are connected, as before described, with the air-pipes. These air-pipes are for a short distance made flexible, as at C', to permit the rotary motion of the head; but the intermediate portions of the pipes, as at C, are made of metal and are rigidly secured in proper hangers or supports. The draw-bar E is extended a considerable distance past its bearing F, and is provided with a pin, $i$, that rests in a spiral slot or cam-groove, $g$, formed in a sleeve, G. This sleeve has slides $h$ that are guided upon ways H H on the bottom of the car, (see Figs. 4 and 10,) which permit the sleeve to reciprocate freely over the draw-bar E, and as it reciprocates, the cam-slot $g$ turns the pin $i$ of the draw-bar and causes the draw-bar to rotate in one direction or the other and couple or uncouple the cars, according to the direction of movement of the sleeve. This sleeve is forced outwardly to set the draw-bars for coupling by a rod, J, connected to a piston in an air-cylinder, K, (see Fig. 15,) and is forced in the opposite direction to couple the draw-bars and heads by a strong spiral spring, I, wound about the draw-bar on the opposite sides of the sleeve from the cylinder.

I will now describe the means for admitting air to the cylinder K to set the draw-bar and head for coupling, reference being had more especially to Figs. 11, 12, 13, and 14.

As either end of a car may at some time be the end of a train to which another car is to be coupled, both ends of each car are equipped alike, and a central register or commutator, Figs. 11 and 12, is provided to apply the blast to either of the two cylinders K K at the opposite ends of the car. This register is set in the length of the air-pipes, and it is composed of a central stationary part, L, and two revolving-heads, L' and L², having through them communicating and registering holes corresponding to the number of air-pipes. The two revolving-heads L' L² connect with the pipes by flexible couplings C', and said heads have bevel gear-wheels which may be alternately engaged by a bevel gear-wheel, M', on a transverse shaft, M, by an adjustment of the latter, and by this means either head L' or L² may be rotated to throw any one of its channels $l'$ or $l^2$ into registration with any one of the channels $l$ or $m$ of the central stationary part, L. The object in duplicating the heads L' L² is simply to permit a blast to come from either end of the car, according to its position with respect to the locomotive. The middle section, L, of the register has channel-ways through it corresponding to the number of air-pipes, and all the channel-ways $l$ extend entirely through it and constitute through-connections for the other cars. One set of channel-ways $m\,m'$ in the middle section does not, however, extend through the said sections, but constitutes the terminal or outlet points for the blast to operate upon the cylinders K of the car carrying the register. These channels $m\,m'$ are duplicated for the same reason of permitting the car to receive its blast from either end. With these terminal outlets $m\,m'$ there connect the pipes N N', (see Fig. 13,) which carry the blast to the two cylinders K K', which operate the couplings at the opposite ends of the car. Thus if a blast comes from the locomotive in the direction of the arrow then said blast finds an outlet through pipe N into cylinder K and works the apparatus (shown in Figs. 4 and 5) at the end of the train to couple with another car. In order to shift the wheel M' from one head of the register to the other, the shaft M is turned in a horizontal plane about a vertical center, and to permit this movement the central section of the register is slotted, as shown in Figs. 12 and 13. The shaft M carries at its outer ends at the sides of the car disks M², and these disks are provided with notches in their peripheries, Fig. 13, corresponding in number to the number of air-pipes and the number of channel-ways in the register, into any of which notches a detent, O², may be thrown to lock the rotary heads of the register into positions in which their channel-ways are in coincidence with the channel-ways of the middle section. These notches are preferably numbered to correspond with the numbers on the heads. The object of this is as follows: If there are two cars in the train and the engineer wants to couple with the third, the engineer swings arm B over opening 3, Fig. 2. Now, if the detent O² is set in notch 2 of disk M², Fig. 13, and this is the last car of the train, the blast transmitted by the conductor will not pass entirely through the register of the end car, but will be directed into pipe N, and thence into cylinder K to operate the coupling on this second or end car with reference to coupling it to the third detached car. The detents O² O² on opposite sides of the car work in unison, being connected by rods or bars O' O' and lever O fulcrumed on the register. As the shaft M is deflected to throw its wheels M' into engagement with one or the other of the heads L' L², it is necessary that said shaft should be locked at the end of its adjustment. This is accomplished as follows: A sliding block, $n$, Fig. 19, forms a bearing for shaft M, and has a curved groove that fits over and slides upon the curved guide-bar $p$, Fig. 18. The detent O² is pivoted to this block at $n^6$ and retains the shaft in its bearing. Said detent has, Fig. 16, also a lug, $n^2$, which passes through a transverse slot, $n^3$, in block $n$ and enters notch $n^4$, Fig. 18, in guide $p$. It will therefore be seen that the detent O² serves three functions—i. e., it locks shaft M² against turning, it locks it against lateral movement on the guide $p$, and it retains the shaft within the bearing-block $n$.

With the coupling as thus described it will be seen that all the couplings of the cars of his train are brought under the direct control of the engineer, and he can not only couple his cars without assistance and without leaving his post, but he can, in any contingency of danger from fire or other cause, uncouple and scatter along the track all the cars of his train, or detach from the rest of the train any number of cars that may chance to become derailed.

Another advantage is that there is always a perfect pneumatic speaking-tube from the engineer's cab to the end of the train, through which the conductor at a distance may communicate directly with the engineer.

To provide for the coupling of the cars by hand, when desired, hand-levers H², Fig. 14, are fulcrumed transversely to the bottom of the car, and have a slotted connection with the sleeves G, so as to impart the necessary motion to the same for coupling or uncoupling.

In making use of my invention I may employ, in addition to the couplings C', others of a similar character to transmit air to the air-brakes or transmit steam or hot air to heaters in the cars. Thus in Figs. 20 and 21 C' represents the coupling-tubes, in addition to which the plates are provided with hot-air couplings W and air-brake couplings T. The hot-air couplings W consist of articulated pipes connected by ball-and-socket joints.

Having thus fully described my invention, what I claim as new, and desire to secure by Letters Patent, is—

1. The combination, with the cars of a train, of pneumatic couplings for connecting the cars, and a series of pneumatic tubes corresponding to the couplings and extending to the cab of the engineer, a reservoir for compressed air, and a switch-conduit or valve mechanism for directing the air-blast through any of said tubes to any one of the couplings, substantially as shown and described.

2. The combination, with a series of tubes extending throughout the train, of a face-plate, A, in the cap having openings through the same connecting with the said tubes, a reservoir for compressed air, a tube, $c$, leading from the reservoir to the center of the face-plate, and a swinging hollow arm or conduit, B, having a channel-way, $b$, adapted to connect the tube $c$ with any one of the tubes C, substantially as and for the purpose described.

3. The pneumatic car-coupling consisting of hooked and slotted draw-bar E, the coupling-head consisting of face-plate D, with hook-shaped guide-arms $d$, the socket-ring D', sleeve E', with bulbous end and bolt E³, and spiral spring E², substantially as and for the purpose described.

4. A car-coupling consisting of a rotary adjustable hook-shaped draw-bar, E, and a spring-seated coupling-head surrounding and loosely connected to the same, substantially as and for the purpose described.

5. A car-coupling having face-plates combined with pneumatic tubes opening through said face-plates, the said openings being adapted, as described, to register with those of the next car and form continuous channels when the cars are coupled, substantially as and for the purpose described.

6. The combination of a rotary adjustable draw-bar, E, having pin or lug $i$, the sleeve G, with cam-groove $g$ and slides $h$, the guides H H, spiral spring I, the piston-rod J, connected to the sleeve G, and the piston and cylinder K, and suitable pipes for transmitting a pneumatic pressure to the said cylinder, substantially as and for the purpose described.

7. The combination, with the pneumatic car-couplings and the series of continuous tubes connecting with the same, of a register or commutator for throwing any one tube into communication with any other tube, substantially as and for the purpose described.

8. The combination, with the continuous tubes, of the register or commutator consisting of stationary section L, with passage-ways $l$ and $m$ $m'$ through it, the two rotary adjustable heads L' L², with corresponding passage-ways and bevel-wheels, and the adjustable shaft M, with bevel-wheel M', adapted to be thrown alternately into engagement with the bevel-wheels of the two heads, substantially as and for the purpose described.

9. The combination of the middle section, L, of the register having through-channels $l$ and terminal channels $m$ $m'$, the adjustable heads L' L², tubes N N', connecting with the terminal channels $m$ $m'$, and the two cylinders K K', connecting with the tubes N N', substantially as and for the purpose described.

10. The combination of the register L L' L² and the communicating tubes, the shaft M, with notched disk M², lever and rods O O', detent O², sliding block n, and curved guide p, substantially as and for the purpose described.

11. The combination, with a series of longitudinal tubes and a register or commutator consisting of stationary section L, with passage-ways and movable heads L' L², connected to the longitudinal tubes, of an adjusting mechanism for rotating said heads, having an indicator-disk notched to represent the openings in the heads, and locking mechanism for said disk, substantially as and for the purpose described.

JOHN P. TURNEY.

Witnesses:
  U. A. CORNISH,
  J. A. WARD.